United States Patent
Maguire

(10) Patent No.: US 9,191,829 B2
(45) Date of Patent: Nov. 17, 2015

(54) SENSING PROXIMITY UTILIZING A WIRELESS RADIO SUBSYSTEM

(71) Applicant: Yael Maguire, Boston, MA (US)

(72) Inventor: Yael Maguire, Boston, MA (US)

(73) Assignee: Facebook, Inc., Menlo Park, CA (US)

(*) Notice: Subject to any disclaimer, the term of this patent is extended or adjusted under 35 U.S.C. 154(b) by 270 days.

(21) Appl. No.: 13/781,274

(22) Filed: Feb. 28, 2013

(65) Prior Publication Data

US 2013/0324056 A1 Dec. 5, 2013

Related U.S. Application Data

(63) Continuation-in-part of application No. 13/485,139, filed on May 31, 2012, now Pat. No. 8,903,329.

(60) Provisional application No. 61/491,380, filed on May 31, 2011.

(51) Int. Cl.
*H04W 24/02* (2009.01)
*H01Q 1/24* (2006.01)
(Continued)

(52) U.S. Cl.
CPC .............. *H04W 24/02* (2013.01); *H01Q 1/1257* (2013.01); *H01Q 1/2216* (2013.01); *H01Q 1/2291* (2013.01); *H01Q 1/245* (2013.01); *H01Q 3/24* (2013.01); *H01Q 21/065* (2013.01); *H04B 5/02* (2013.01); *H04B 7/0608* (2013.01);
(Continued)

(58) Field of Classification Search
CPC ........ H04B 1/0458; H04B 17/21; H04W 4/02
USPC .............. 455/85, 73, 24, 414.1, 23, 505, 506; 342/113, 28; 340/471
See application file for complete search history.

(56) References Cited

U.S. PATENT DOCUMENTS 3,634,884 A * 1/1972 Ross ................................ 342/28
5,532,697 A * 7/1996 Hidaka et al. .................. 342/104
(Continued)

FOREIGN PATENT DOCUMENTS

JP 2007/305004 11/2007
JP 2009/169602 7/2009
(Continued)

OTHER PUBLICATIONS

International Search Report and Written Opinion for International Application No. PCT/US2012/040199, Dec. 28, 2012.
(Continued)

*Primary Examiner* — Minh D Dao
(74) *Attorney, Agent, or Firm* — Baker Botts L.L.P.

(57) ABSTRACT

In particular embodiments, a wireless communications device includes an RF transceiver, a plurality of antennas coupled to the transceiver, and processing circuitry. The device may transmit an RF reference signal using the RF transceiver. When the RF reference signal is reflected back from each of the plurality of antennas, the device may determine at least one characteristic of the RF reference signal (e.g., amplitude, phase, dispersion, waveform shape, or distortion). The device may then characterize at least one aspect of the environment around the device based on the characteristic and control a function of the device based on the at least one aspect. For example, the device may detect that an object (e.g., a hand or other body part) is approaching the device but not yet in contact with the device and activate a first feature of the device based on the characterization.

27 Claims, 11 Drawing Sheets

(51) Int. Cl.
*H01Q 3/24* (2006.01)
*H01Q 21/06* (2006.01)
*H04B 5/02* (2006.01)
*H04B 7/06* (2006.01)
*H01Q 1/12* (2006.01)
*H01Q 1/22* (2006.01)
*H04B 17/11* (2015.01)

(52) U.S. Cl.
CPC .............. *H04B 7/0691* (2013.01); *H04B 17/11* (2015.01); *H04M 2250/22* (2013.01)

(56) References Cited

U.S. PATENT DOCUMENTS

| | | | | |
|---|---|---|---|---|
| 5,534,871 | A * | 7/1996 | Hidaka et al. | 342/113 |
| 6,496,136 | B1 * | 12/2002 | Mucciardi | 342/22 |
| 6,633,254 | B1 * | 10/2003 | Sutphin | 342/28 |
| 6,895,225 | B1 | 5/2005 | Talvitie | |
| 8,073,515 | B2 | 12/2011 | Rofougaran | |
| 8,175,564 | B2 | 5/2012 | Saito | |
| 8,525,730 | B2 | 9/2013 | Christian | |
| 2002/0033803 | A1 * | 3/2002 | Holzrichter et al. | 345/158 |
| 2006/0077052 | A1 * | 4/2006 | Matsuoka | 340/471 |
| 2007/0035399 | A1 * | 2/2007 | Hecht et al. | 340/572.1 |
| 2007/0109177 | A1 * | 5/2007 | Baath et al. | 342/124 |
| 2007/0182660 | A1 | 8/2007 | Wu | |
| 2009/0305742 | A1 | 12/2009 | Caballero et al. | |
| 2009/0322592 | A1 * | 12/2009 | Kai | 342/107 |
| 2011/0109169 | A1 | 5/2011 | Shimamoto | |
| 2011/0187578 | A1 * | 8/2011 | Farneth et al. | 342/27 |
| 2012/0309326 | A1 | 12/2012 | Maguire | |
| 2015/0018676 | A1 * | 1/2015 | Barak | 600/430 |

FOREIGN PATENT DOCUMENTS

| | | |
|---|---|---|
| KR | 10-2001-0006519 | 1/2001 |
| KR | 10-2005-0093541 | 9/2005 |

OTHER PUBLICATIONS

Response to Non-Final Office Action for U.S. Appl. No. 13/485,139, Nov. 26, 2012.
Response to Final Office Action for U.S. Appl. No. 13/485,139, Apr. 16, 2013.
Response to Non-Final Office Action for U.S. Appl. No. 13/485,139, Jan. 27, 2014.
Response to Final Office Action for U.S. Appl. No. 13/485,139, Jun. 19, 2014.
Notice of Allowance for U.S. Appl. No. 13/485,139, Jul. 18, 2014.
Amendment After Allowance as filed for U.S. Appl. No. 13/485,139, Aug. 12, 2014.
Non-Final Office Action for U.S. Appl. No. 13/485,139, Sep. 20, 2012.
Final Office Action for U.S. Appl. No. 13/485,139, Jan. 29, 2013.
Non-Final Office Action for U.S. Appl. No. 13/485,139, Aug. 5, 2013.
Final Office Action for U.S. Appl. No. 13/485,139, Feb. 25, 2014.
International Search Report and Written Opinion for International Application No. PCT/US2012/040199, May 31, 2012.
Translated Abstract 6519, Korea.
Translated Abstract 93541, Korea.
PCT/US2014/018579 International Search Report, Jun. 27, 2014.
Amendment as filed for U.S. Appl. No. 14/468,851, Apr. 1, 2015.
Non-Final Office Action for U.S. Appl. No. 14/468,851, Dec. 12, 2014.
Response to Non-Final Office Action for U.S. Appl. No. 14/468,851, Feb. 25, 2015.
Notice of Allowance for U.S. Appl. No. 14/468,851, Mar. 12, 2015.

* cited by examiner

US 9,191,829 B2

SENSING PROXIMITY UTILIZING A WIRELESS RADIO SUBSYSTEM

PRIORITY

This application is a continuation-in-part claiming priority under 35 U.S.C. §120 to U.S. patent application Ser. No. 13/485,139, filed 31 May 2012, which claims the benefit of U.S. Provisional Patent Application No. 61/491,380 filed May 31, 2011, which is hereby incorporated herein by reference in its entirety.

TECHNICAL FIELD

Particular embodiments relate to controlling a wireless communications device using antenna elements of the device.

BACKGROUND

Mobile communications devices communicate wirelessly with various types of devices, such as base stations, satellites and other wireless devices, using any of a number of wireless protocols using electromagnetic waves as RF signals. In some mobile devices, the RF signal is at ISM-band frequencies, between about 2.400 GHz and about 2.483 GHz (used for IEEE 802.11 Wi-Fi and Bluetooth). In other mobile devices, the RF signal is transmitted at five GHz U-NII band frequencies, between about 4915 MHz and about 5825 MHz (used for Wi-Fi). In other mobile devices, the RF signal is at 1575.42 and 1227.60 MHz (used for GPS). In other mobile devices, the RF signal is at UMTS/LTE band frequencies, which may be about 800 MHz, about 850 MHz, about 900 MHz, about 1500 MHz, about 1700 MHz, about 1800 MHz, about 1900 MHz, or about 2100 MHz. Of course, other frequency bands may be supported by the mobile device. For each frequency band supported by the mobile device, an antenna must be able to transduce the electromagnetic wave into a voltage at a specified impedance.

The mobile device typically has antennas that may be planar or three-dimensional structures distributed with respect to a device housing, e.g., embedded within the mechanical structure of the device. There may be a number of antennas greater than, equal to or less than the number of wireless frequencies and standards supported by the device. A set of antennas may be around the perimeter of the device, on the back, and/or on the front.

Most materials are not RF transparent and will cause diffraction effects. One of the challenges with mobile devices is that human body parts, such as hands and arms, may attenuate the signal produced from a transmitter and/or may attenuate signals transmitted by other devices, e.g., due the absorption/redirection of radio frequency signals on the human body. For example, a hand holding a mobile communication device can affect transmission and reception of wireless communication signals.

SUMMARY OF PARTICULAR EMBODIMENTS

In particular embodiments, a wireless communications device can detect a human hand or other body part as it approaches the device and control a feature of or functionality on the device based on the detection. The device may transmit an RF reference signal using the RF transceiver. When the RF reference signal is reflected back from each of the plurality of antennas, the device may determine at least one characteristic of the RF reference signal (e.g., amplitude, phase, dispersion, waveform shape, or distortion). The device may then characterize at least one aspect of the environment around the device based on the characteristic and control a function of the device based on the at least one aspect. For example, the device may detect that an object (e.g., a hand or other body part) is approaching the device but not yet in contact with the device and activate a first feature of the device based on the characterization.

DESCRIPTION OF EXAMPLE EMBODIMENTS

Definitions

Figure 1:
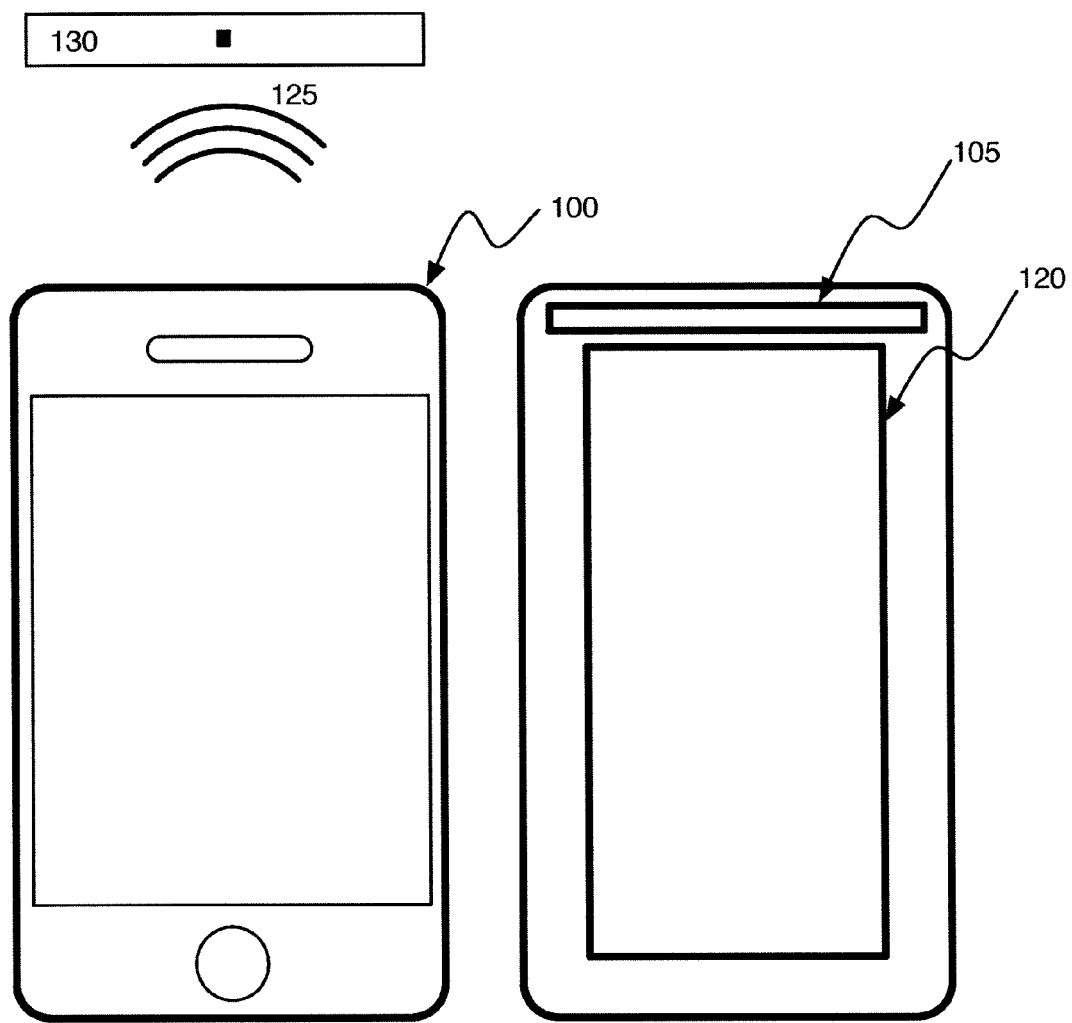
FIG. 1 schematically shows the front and back sides of a mobile communications device.

As used in this description and the accompanying claims, the following terms shall have the meanings indicated, unless the context otherwise requires:

A "set" has at least one member.

A "wireless communications device" is a device that has wireless communication capabilities, such as by Bluetooth, Wi-Fi, GSM (GPRS, 3G, 4G) or CDMA, GPS, RFID, or other wireless communication technology. A wireless communications device may be virtually any type of device, e.g., from mobile devices to anything that could be tagged in the physical world.

A "mobile communications device" is a portable wireless communications device.

With regard to a plurality of antennas, the term "distributed with respect to the housing" means that the antennas are placed at various locations within the housing and/or on one or more internal or external surfaces of the housing and/or forming one or more surfaces of the housing itself (e.g., all or part of a front, back, and/or outer edge of the housing).

In a first embodiment of the invention there is provided a wireless communications device having a housing, an RF transceiver disposed in the housing, a plurality of antennas coupled to the transceiver and distributed with respect to the housing; and processing circuitry disposed in the housing and coupled to the RF transceiver. The processing circuitry is configured to cause the RF transceiver to transmit an RF reference signal, to determine at least one characteristic of the RF reference signal reflected back from each of the plurality of antennas, to store the at least one determined characteristics, and to process the at least one determined characteristics in order to select at least one antenna of the plurality of antennas based on the at least one determined characteristics.

In a further related embodiment, the processing circuitry is configured to select a plurality of antennas based on the at least one characteristic of the reflected signal from each of the plurality of antennas and to selectively couple the plurality of selected antennas to the transceiver. Optionally, the communications device includes a programmable switching device coupled to the plurality of antennas and to the processing circuitry, wherein the processing circuitry is configured to selectively couple the plurality of selected antennas to the transceiver via the programmable switching device. Also optionally, the processing circuitry is configured to selectively couple the plurality of selected antennas to the transceiver in parallel via the programmable switching device.

In another related embodiment, the device includes a controllable impedance coupled to the plurality of antennas and to the processing circuitry, wherein the processing circuitry is configured to selectively control impedance between the RF transceiver and at least one antenna.

In yet another related embodiment, the at least one characteristic includes at least one of amplitude, phase, dispersion, waveform shape, or distortion.

In another embodiment, the invention is a method of providing RF communication using a wireless communications device having an RF transceiver and a plurality of antennas coupled to the RF transceiver. The method of this embodiment includes: at the wireless communications device, transmitting an RF reference signal; determining at least one characteristic of the RF reference signal reflected back from each of the plurality of antennas; storing the at least one determined characteristics; and processing the at least one determined characteristics in order to select at least one antenna of the plurality of antennas based on the at least one determined characteristics.

In a related embodiment, processing the at least one determined characteristics in order to select at least one antenna of the plurality of antennas based on the at least one determined characteristics includes: selecting a plurality of antennas based on the at least one characteristic of the reflected signal from each of the plurality of antennas; and selectively coupling the plurality of selected antennas to the transceiver.

As a further option of this related embodiment, selectively coupling the plurality of selected antennas to the transceiver includes selectively coupling the plurality of selected antennas to the transceiver via a programmable switching device. Furthermore, and optionally, selectively coupling the plurality of selected antennas to the transceiver via a programmable switching device includes selectively coupling the plurality of selected antennas to the transceiver in parallel via the programmable switching device.

Another related embodiment further includes a controllable impedance coupled to the plurality of antennas and to the processing circuitry, wherein the processing circuitry is configured to selectively control impedance between the RF transceiver and at least one antenna.

In another related embodiment, the at least one characteristic includes at least one of amplitude, phase, dispersion, waveform shape, or distortion.

In another embodiment, there is provided a wireless communications device having a housing, an RF transceiver disposed in the housing, a plurality of antennas coupled to the transceiver and distributed with respect to the housing, and processing circuitry disposed in the housing and coupled to the RF transceiver. The processing circuitry is configured to cause the RF transceiver to transmit an RF reference signal, to determine at least one characteristic of the RF reference signal reflected back from each of the plurality of antennas, to store the at least one determined characteristics, and to process the at least one determined characteristics in order to control at least one function of the device.

In a further related embodiment, the at least one characteristic includes at least one of amplitude, phase, dispersion, waveform shape, or distortion. Optionally, the at least one function includes at least one of selecting at least one antenna to couple to a transceiver, selecting at least one antenna to decouple from a transceiver, or coupling multiple antennas to form a larger effective antenna. Optionally, the processing the at least one determined characteristics in order to control at least one function includes characterizing at least one aspect of the environment around the device based on the at least one determined characteristics; and controlling at least one function of the device based on the at least one aspect. Optionally, the at least one aspect includes at least one of, the presence or absence of an object, the distance of an object from the device, the location of an object relative to the device, movement of an object relative to the device, orientation of an object relative to the device, a disposition of the device; or a time-of-flight measurement of an object to the device.

In a further related embodiment, the at least one function includes activating a feature of the device based on such characterization. Optionally, the feature is activated upon detecting that an object is approaching the device but before the object contacts the device. Also optionally, the at least one function includes controlling an application running in the device based on such characterization. Optionally, the object includes a body part.

In another embodiment, the invention provides a method of controlling at least one function of a wireless communications device providing RF communication using a wireless device having a plurality of antennas. The method includes: at the wireless communications device, transmitting an RF reference signal; determining at least one characteristic of the RF reference signal reflected back from each of the plurality of antennas; storing the at least one determined characteristics; and processing the at least one determined characteristics in order to control at least one function of the device.

In a further related embodiment, the at least one characteristic includes at least one of amplitude, phase, dispersion, waveform shape, or distortion. Optionally, the at least one function includes at least one of selecting at least one antenna to couple to a transceiver, selecting at least one antenna to decouple from a transceiver, or coupling multiple antennas to form a larger effective antenna. Optionally, the processing the at least one determined characteristics in order to control at least one function includes characterizing at least one aspect of the environment around the device based on the at least one determined characteristic and controlling at least one function of the device based on the at least one aspect. Optionally, the at least one aspect includes at least one of the presence or absence of an object, the distance of an object from the device, the location of an object relative to the device, movement of an object relative to the device, orientation of an object relative to the device, a disposition of the device; or a time-of-flight measurement of an object to the device. Optionally, the at least one function includes activating a feature of the device based on such characterization. Optionally, the feature is activated upon detecting that an object is approaching the device but before the object contacts the device. Optionally, the at least one function includes controlling an application running in the device based on such characterization. Optionally, wherein the object includes a body part.

FIG. 1 schematically shows the front and back sides of an exemplary mobile communications device 100. The mobile device communicates wirelessly with various types of devices, such as base stations, satellites and other wireless devices, using any of a number of wireless protocols using electromagnetic waves as RF signals. In some mobile devices, the RF signal is at ISM-band frequencies, between about 2.400 GHz and about 2.483 GHz (used for IEEE 802.11 Wi-Fi and Bluetooth). In other mobile devices, the RF signal is transmitted at five GHz U-NII band frequencies, between about 4915 MHz and about 5825 MHz (used for Wi-Fi). In other mobile devices, the RF signal is at 1575.42 and 1227.60 MHz (used for GPS). In other mobile devices, the RF signal is at UMTS/LTE band frequencies, which may be about 800 MHz, about 850 MHz, about 900 MHz, about 1500 MHz, about 1700 MHz, about 1800 MHz, about 1900 MHz, or about 2100 MHz. Of course, other frequency bands may be supported by the mobile device. For each frequency band supported by the mobile device, an antenna must be able to transduce the electromagnetic wave into a voltage at a specified impedance. The mobile device typically has antennas that may be planar or three-dimensional structures distributed with respect to a device housing, e.g., embedded within the mechanical structure of the device. There may be a number of antennas greater than, equal to or less than the number of wireless frequencies and standards supported by the device. A set of antennas may be around the perimeter of the device 100, on the back 120, and/or on the front. It should be noted that antenna 120 is simply a bounding box of a set of geometric patterns that define the set of antennas.

In this exemplary embodiment, an auxiliary antenna 105 is shown to interface the mobile device with one or more RFID tags 130 via a radio frequency field 125 at 840-960 MHz, or in principle other RF/microwave bands, such as 2.400-2.483 GHz. If the 2.400-2.483 GHz band is not available for RFID operation, the auxiliary antenna 105 may be needed. The primary purpose of the mobile device is for all communication other than the RFID function; therefore, the antennas 120 will occupy the largest area or volume of the accessible area of the device. Antenna 105 may not be the ideal geometry given the wavelength of interaction for RFID (typically 12-35 cm), but nevertheless, given a constrained geometry of a mobile phone, the compromise may be necessary.

Most materials are not RF transparent and will cause diffraction effects. One of the challenges with mobile devices is that human body parts, such as hands and arms, may attenuate the signal produced from a transmitter and/or may attenuate signals transmitted by other devices, e.g., due the absorption/redirection of radio frequency signals on the human body. For example, a hand holding a mobile communication device can affect transmission and reception of wireless communication signals.

Figure 2:
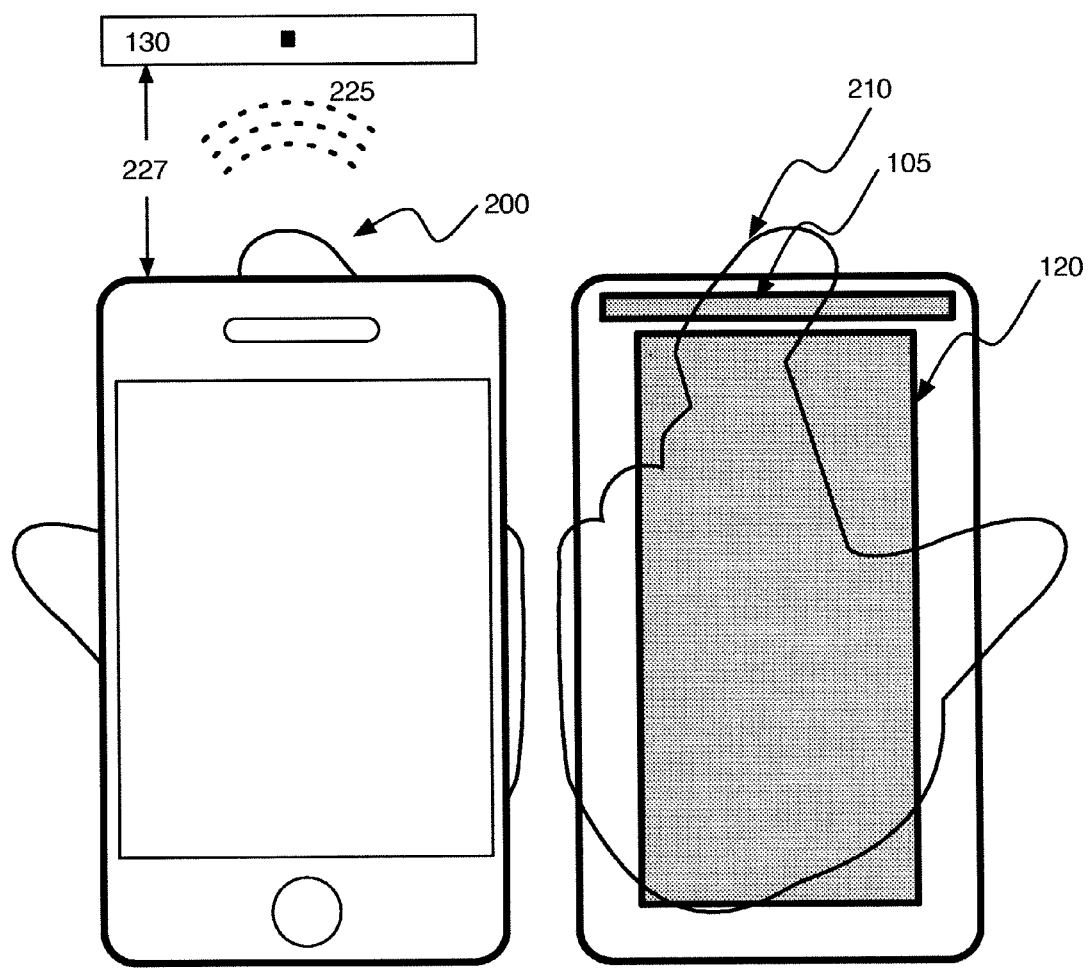
FIG. 2 schematically shows a hand holding the device of FIG. 1 on the back of the device.

FIG. 2 schematically depicts a hand 200 holding a device on the back of the device 210. In this case, the finger and proximity of the hand means the RFID antenna 105 is either poorly matched now and/or cannot radiate properly. In the state of the art, RFID reader circuitry incorporates self-jammer cancellation, return loss matching, or other means of improving the noise floor or dynamic range of the receiver. This may address the poor antenna match, but cannot address the diminished antenna radiation pattern. In the ideal case of RFID operation, at the point the RFID tag transitions from being powered to not-powered, termed the power up threshold, the receiver of an RFID reader still possesses sufficient receive margin to decode packets with very low probability of error, or packet error rate (PER). This is termed transmitter-limited. In the case where the receiver is the limiting factor, not the RFID tag, this is termed receiver-limited. As RFID tags 130 are powered by the RFID field 225, the hand blocking the RFID antenna 105 may diminish the tag read and write range to the extent that the tags may not power up in the manipulatory range 227. Note the data, location and voice-communication antennas 120 may also be subject to this change in antenna characteristics, but since the operational path loss for wireless data, location and voice communications is greater (90-150 dB) than RFID path loss (40-60 dB), the link margin in the presence of the hand usually remains positive. Therefore, the RFID communications system has two disadvantages to contend with in the incorporation of mobile phones relative to conventional data, location, and voice communications: a low link margin, and a sub-optimal antenna design on the mobile communications device.

In certain embodiments, a wireless communications device includes multiple switchable antenna elements that may be used to improve interfacing of the wireless communications device with other devices, such as for interfacing of an RFID-equipped mobile communications device with other RFID devices (e.g., to better ensure power delivery to and/or communication with such other RFID devices) and/or may be used to characterize various aspects of the environment around the wireless communications device, such as to help create a more natural interface for allowing people to interact with the wireless communications device.

Figure 3:
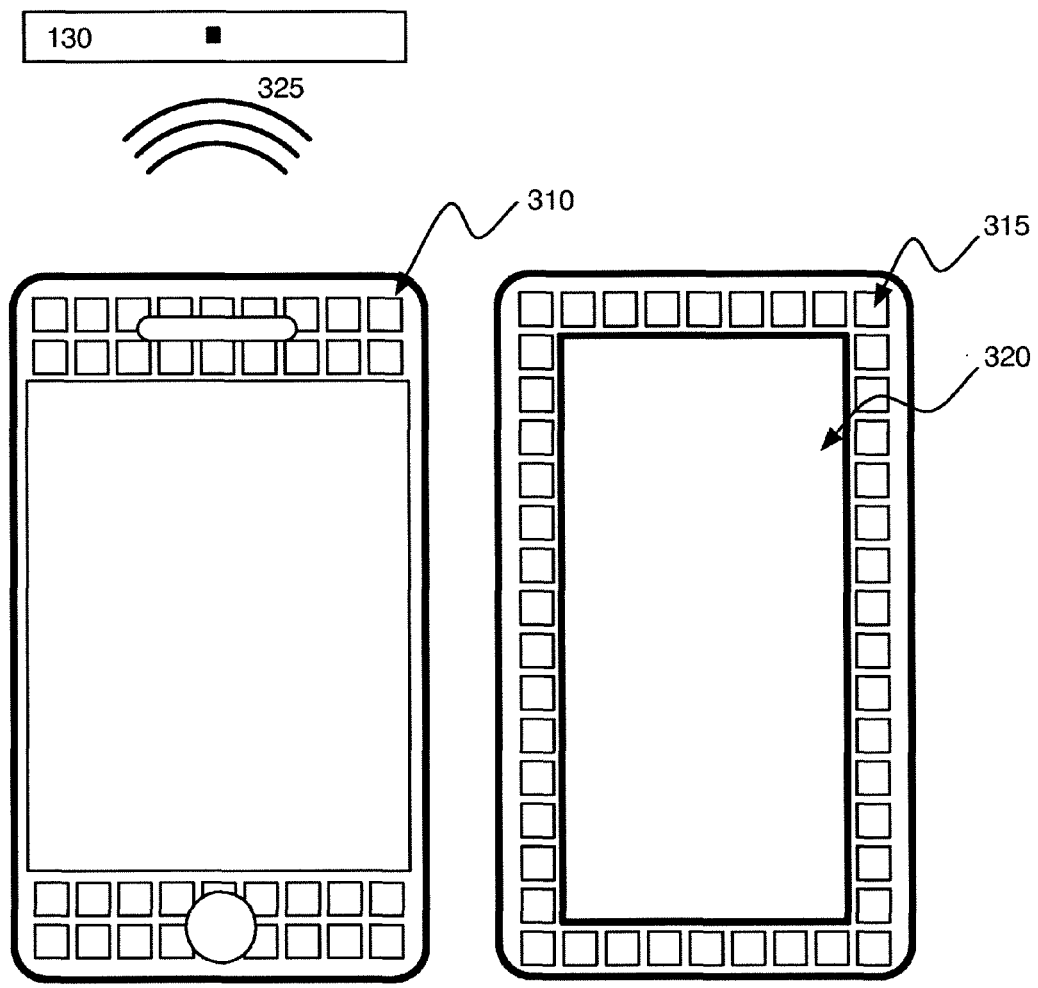
FIG. 3 shows an alternative design of an antenna system including N identical or different antenna elements, in accordance with an exemplary embodiment.

FIG. 3 shows an alternative design of an antenna system 300, including N identical or different antenna elements (310 for example), in accordance with one exemplary embodiment. These elements may exist in one embodiment exemplary as etched or printed elements on a printed or flexible circuit board, although the disclosed embodiments are not limited to etched or printed antenna elements and instead can include one or more other types of antennas. The antennas may be virtually any shape, size, thickness, or placement. For example, using 3D printing or conventional machining technology, these elements may be three-dimensional metal structures. Each element may possess an independent path to the transmitter, or if configured for full flexibility, additionally or alternatively may allow a voltage, ground, resistive and/or reactive connection to neighboring elements to allow a larger antenna to be formed. The size, number and shape of the elements shown in FIG. 3 are only a suggestion of the design. The original far field antennas for data and voice communications 120 may also be included among the antenna elements, e.g., using M smaller antennas arranged in a periodic or aperiodic lattice. Thus, for example, antenna elements may be included for ISM-band frequencies between about 2.400 GHz and about 2.483 GHz (used for Wi-Fi and Bluetooth), for 5 GHz U-NII band frequencies between about 4915 MHz and about 5825 MHz (used for Wi-Fi), for 1575.42 and 1227.60 MHz band frequencies (used for GPS), for UMTS/LTE band frequencies (which may be about 800 MHz, about 850 MHz, about 900 MHz, about 1500 MHz, about 1700 MHz, about 1800 MHz, about 1900 MHz, or about 2100 MHz), for 840-960 MHz band frequencies (used for RFID), and/or for other RF/microwave bands. It should be noted that although this diagram shows the antenna elements as visible on the surface of the mobile communication device, this is for illustrative purposes and the antenna elements may not be visible, e.g., hidden under glass, plastic, ceramic, composite or other material.

Figure 4:
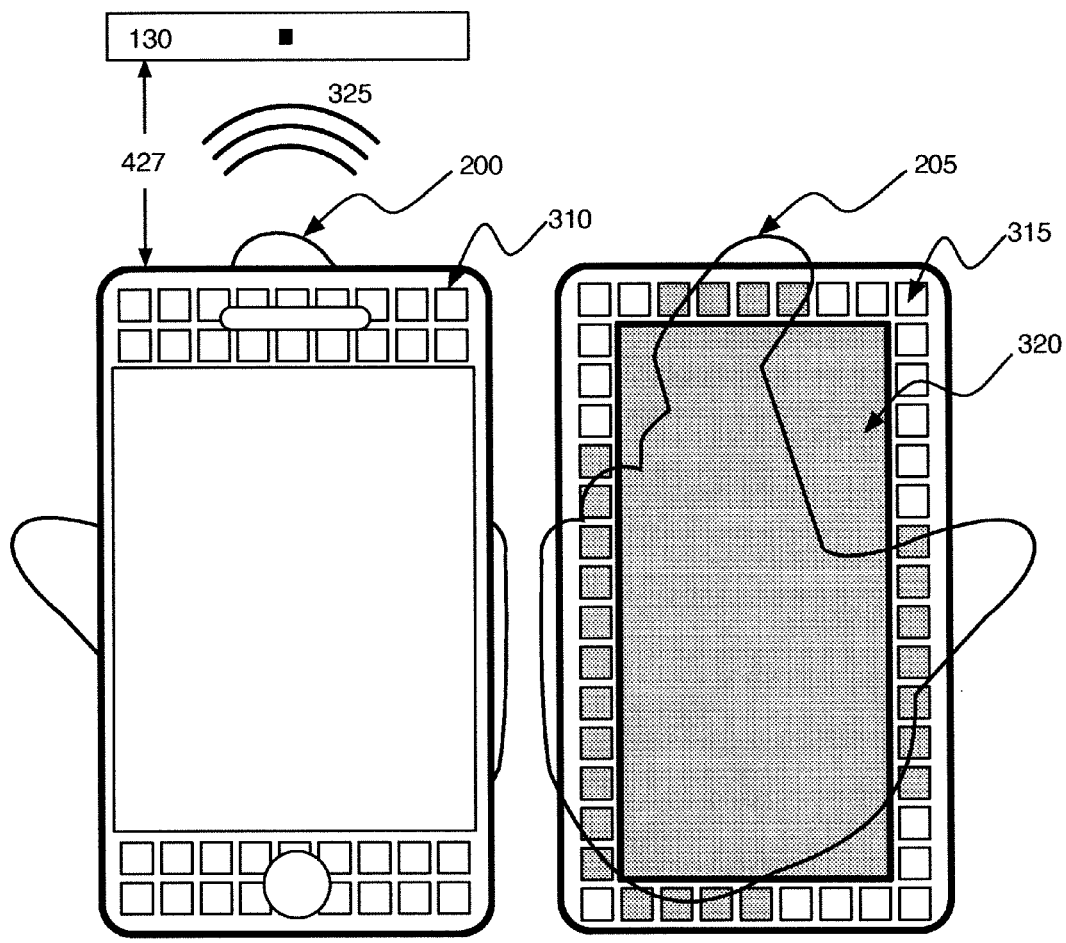
FIG. 4 shows the antenna configuration of FIG. 3 when the hand is present.

FIG. 4 shows the same antenna configuration 310 when the hand 200 is present. Although many antenna elements are covered on the back of the device by the hand 205, depicted as darkened elements, several antenna elements remain uncovered and can be connected to the transmitter independently of the poor return loss and radiating paths coupled to the hand. One example of an antenna element that is not impacted by the presence of the hand is 315. In certain embodiments, some or all of the free antenna elements may be connected in parallel to the transmitter and/or receiver of one or more radios. In other embodiments where a radio protocol has greater than one transmitter and/or receiver, free elements may be independently connected to each transmitter and receiver. In still other embodiments, some or all of the free antenna elements may be connected to each other to optimize radiation and power transfer. With regard to a mobile communications device with RFID communication capabilities as discussed with reference to FIGS. 1-2, utilizing the free antenna elements 315 unburdened by being connected to loaded antenna elements, it is assumed the RF field produced by the mobile communications device 325 will be greater in magnitude to the traditional design 105 shown in FIG. 2, but may be not as large as the RF field 125 when the hand is not present as shown in FIG. 1. If the RF field 325 is larger than the RF field 225, the read range 427 should be larger than 227, making the manipulatory space more reliable. It should be noted that this embodiment may be generalized such that the RFID tag 130 is another wireless communications device, and that antenna 320 could be composed of a plurality of antenna elements such as 310, 315.

Figure 5:
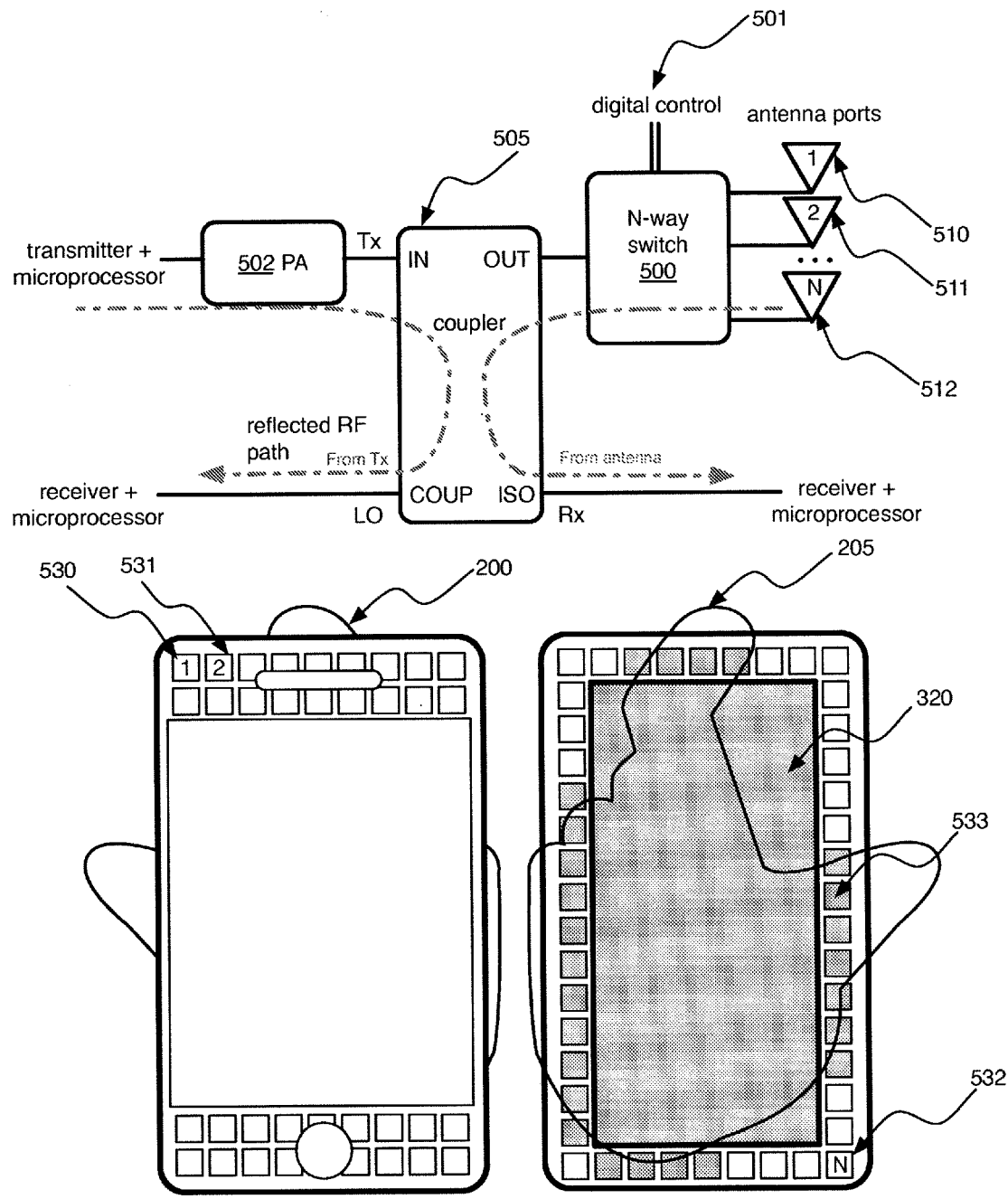
FIG. 5 is a schematic block diagram for circuitry used to implement the features of FIG. 4, in accordance with an exemplary embodiment.

FIG. 5 is a schematic block diagram for circuitry used to implement the features of FIG. 4, in accordance with an exemplary embodiment. As in a conventional RFID reader, a directional coupler 505 couples transmitter power to the OUT port; the directional coupler is coupled to one of N antenna ports 510-512 through a digitally controllable switch 500 controlled by digital signals 501. In some embodiments, the directional coupler 505 could be a circulator, and the COUP port would not be present. In this example, three of the N antennas 530-532 are highlighted. The ISO port of the directional coupler carries the power from the antennas that goes into the OUT port and directs this to the receiver. This includes the self-jammer from the transmitter and the RFID tag backscatter data, and the transmit power at the IN port that is reduced by the directional coupler isolation (typically 15-40 dB). The self-jammer level is a function of the transmit power level and the return loss of the antenna. The RFID tag backscatter data level is a function of the path loss to the RFID tag and the RFID tag itself. The COUP port contains the transmit power reduced by the coupling factor (typically 3-20 dB) and the antenna RF signal reduced by the directional coupler isolation (typically 15-40 dB). The coupled power, like the self-jammer level is a function of the transmit power. The antennas 510-512 shown have their corresponding bounding box antenna elements on the mobile device 530-532 with the hand 200, 205. In this embodiment, due to the N-way switch 500, only a single antenna element may be active at a time. However, by applying time-sequenced digital controls 501, the antenna patterns may use multiple antenna elements appropriately.

Figure 6:
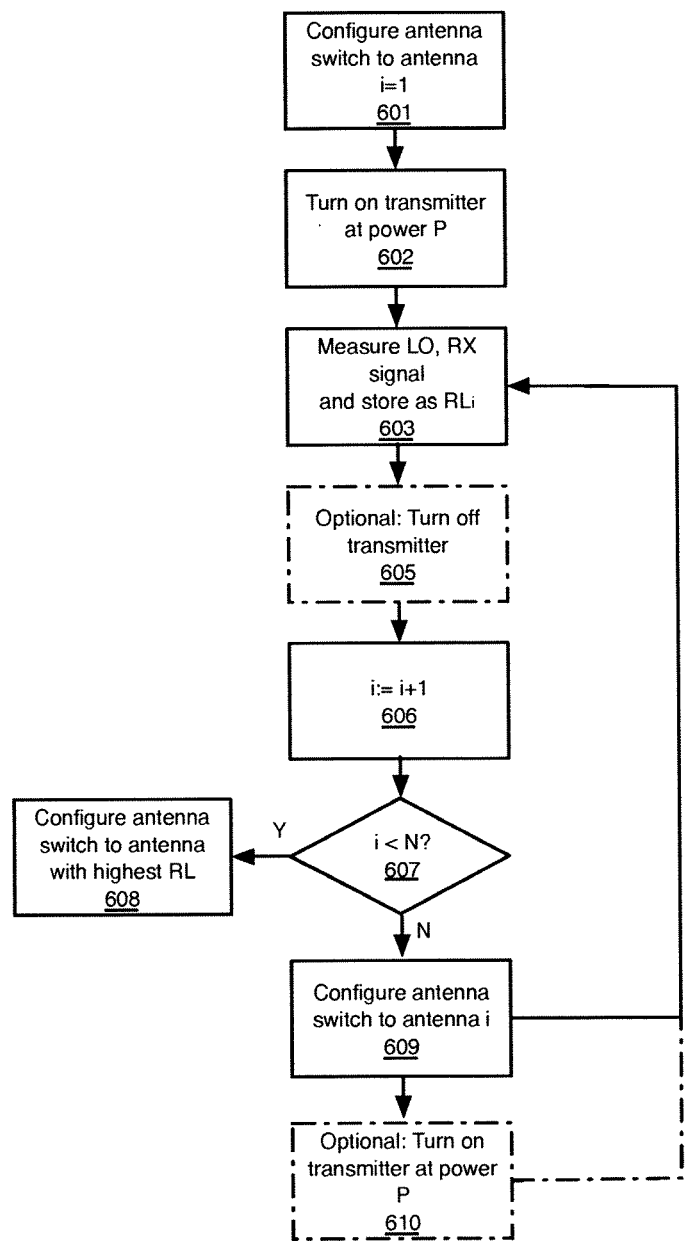
FIG. 6 is a logic flow diagram for determining the antenna (s) that should be selected in FIG. 5, in accordance with an exemplary embodiment.

FIG. 6 is a logic flow diagram for determining the antenna (s) that should be selected in FIG. 5, in accordance with an exemplary embodiment. At the start of the algorithm, the digital switch 500 is configured to switch position 1 601. If the analog switch can be damaged with the RF power on, the transmitter is optionally turned on to power P 602. This power may be lower than the final transmitter power, in order to save power. Measurements on the ISO and COUP ports are made on the directional coupler 505. The ISO port measures the RX signal, while the COUP port measures the TX signal. The pair of TX (power or I&Q signal) and RX (power or I&Q signal) may be stored as a vector. The transmitter is then optionally turned off 605, and the counter i is incremented 606. If the value of i is less than N 607, the antenna is switched to this new setting 609, and optionally the power is turned on to power P 610, then the cycle is repeated again 603. If i is equal to N 607, the antenna switch 500 is configured to choose the antenna with the lowest combined TX and RX vector norm or highest return loss in dB. In the case where the switch 500 allows multiple antennas to be connected together in parallel (corresponding loads may be present as well), two or more of the top M antennas (M<N) that have the lowest combined TX and RX vector norm or highest return loss in dB may be connected in parallel. If the top M elements cannot be connected together, the elements may be switched in a time-sequenced manner.

Figure 7:
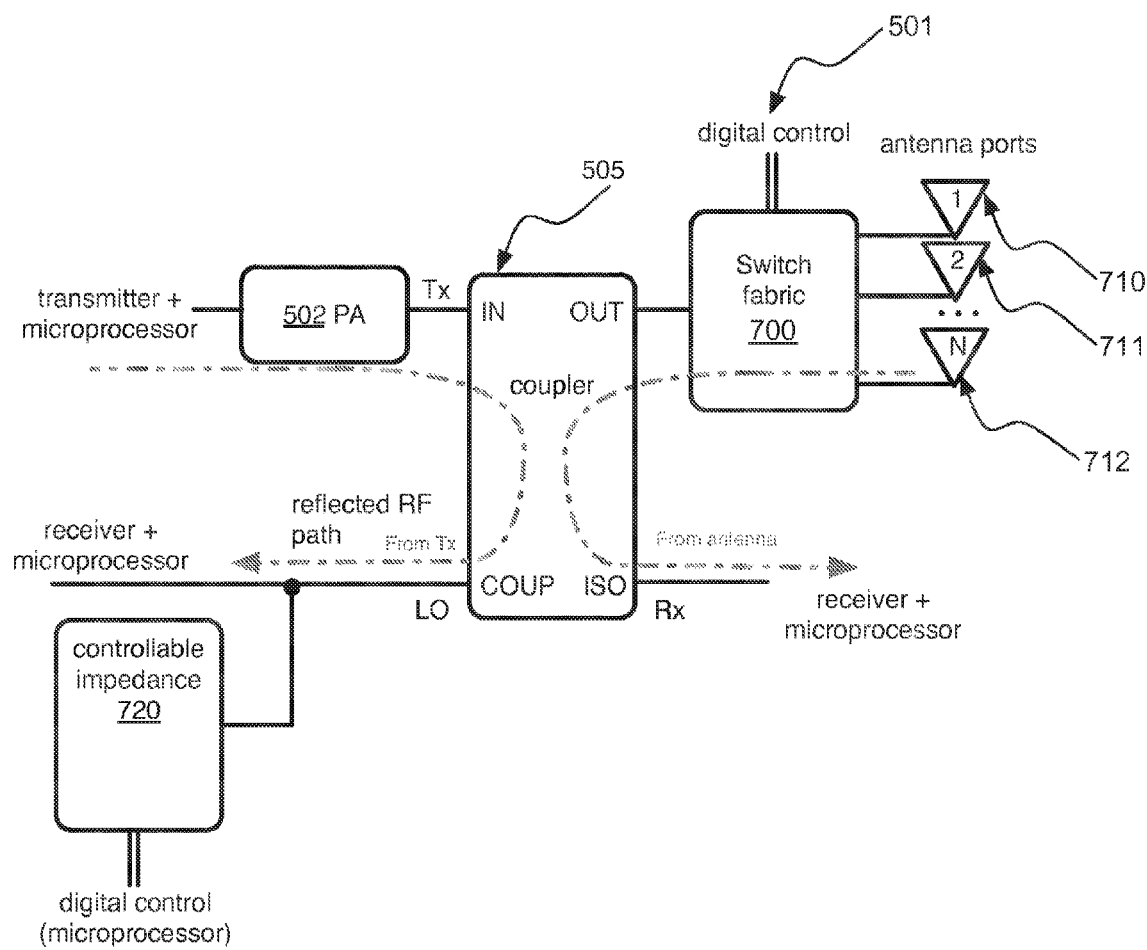
FIG. 7 is a schematic block diagram showing circuitry with multiple antenna elements connected to a switch fabric, in accordance with an exemplary embodiment.

FIG. 7 is a schematic block diagram showing circuitry with multiple antenna elements 710-712 connected to a switch fabric 700, in accordance with an exemplary embodiment. This fabric may allow neighboring antenna elements to be connected together to enable a larger antenna and/or may allow multiple non-neighboring antennas to be connected together. A controllable impedance 720 may be added to the COUP port of the directional coupler to allow energy to be maximally transferred from the transmitter, and for energy to be transmitted into the receiver (e.g., when the resulting antenna structure does not possess an impedance that matches the impedance of the transmit power amplifier (PA) 502 and directional coupler 505).

Figure 8:
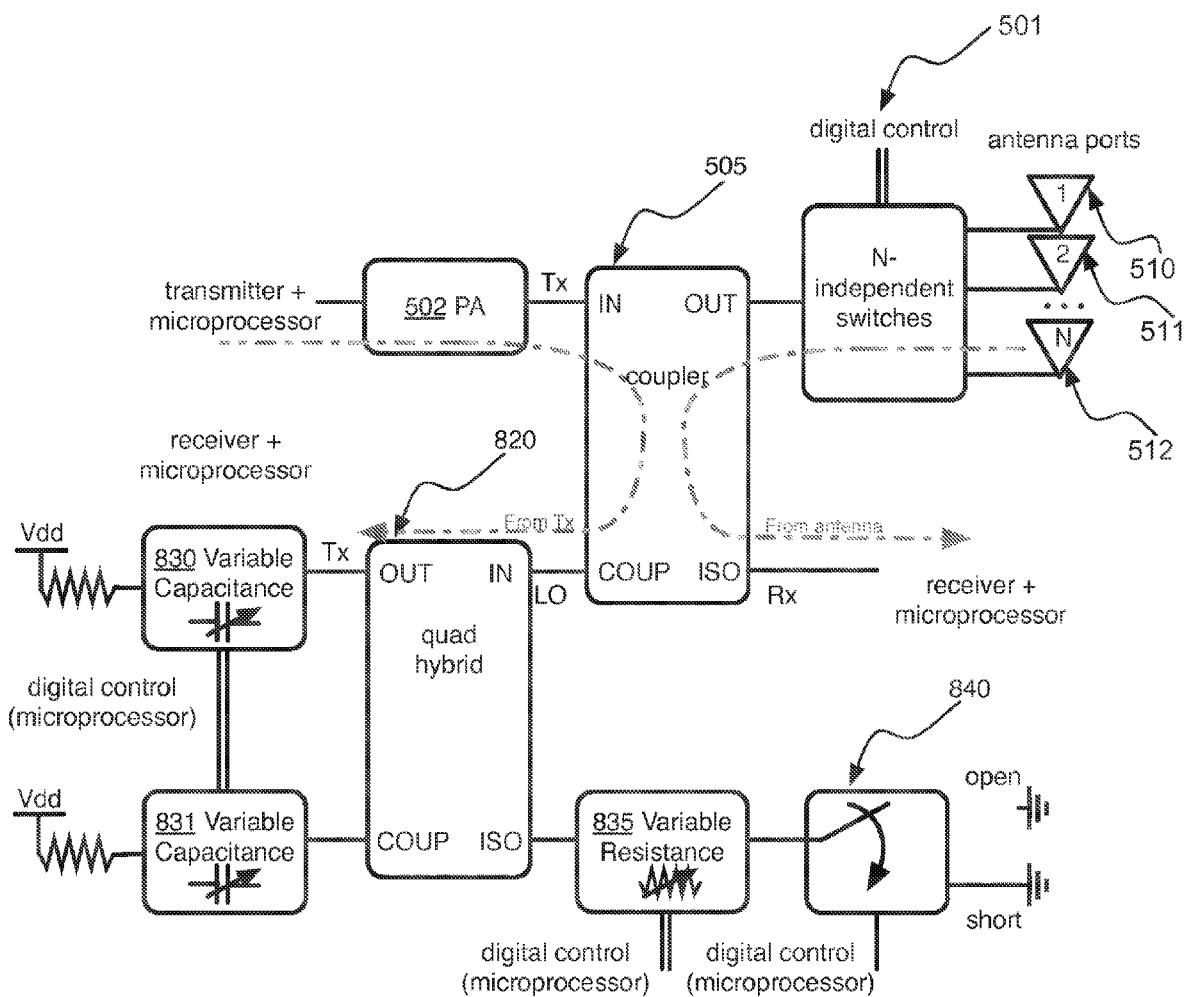
FIG. 8 is a schematic block diagram showing a more detailed circuitry implementation, in accordance with an exemplary embodiment.

FIG. 8 is a schematic block diagram showing a more detailed circuitry implementation, in accordance with an exemplary embodiment. The switch matrix is implemented as N-independent switches where antennas 510-512 may be connected in parallel. The controllable impedance is implemented as an impedance control circuit, for example an impedance control circuit as described in United States Published Patent Application No. US 2010/0069011, which is hereby incorporated herein by reference. A quadrature hybrid element 820 is similar to a directional coupler, except the coupling between the IN and OUT and the IN and COUP ports are equal and with a value of −3 dB. The phase relationship between the OUT and COUP ports is 90 degrees out of phase. On the OUT and COUP ports, variable capacitances 830-831 and variable resistance 835 on the ISO port allow one to create a range of complex impedances in one half of a Smith Chart. The open and short switch 840, allows one to flip location of the impedance to the other half of the Smith Chart.

Figure 9:
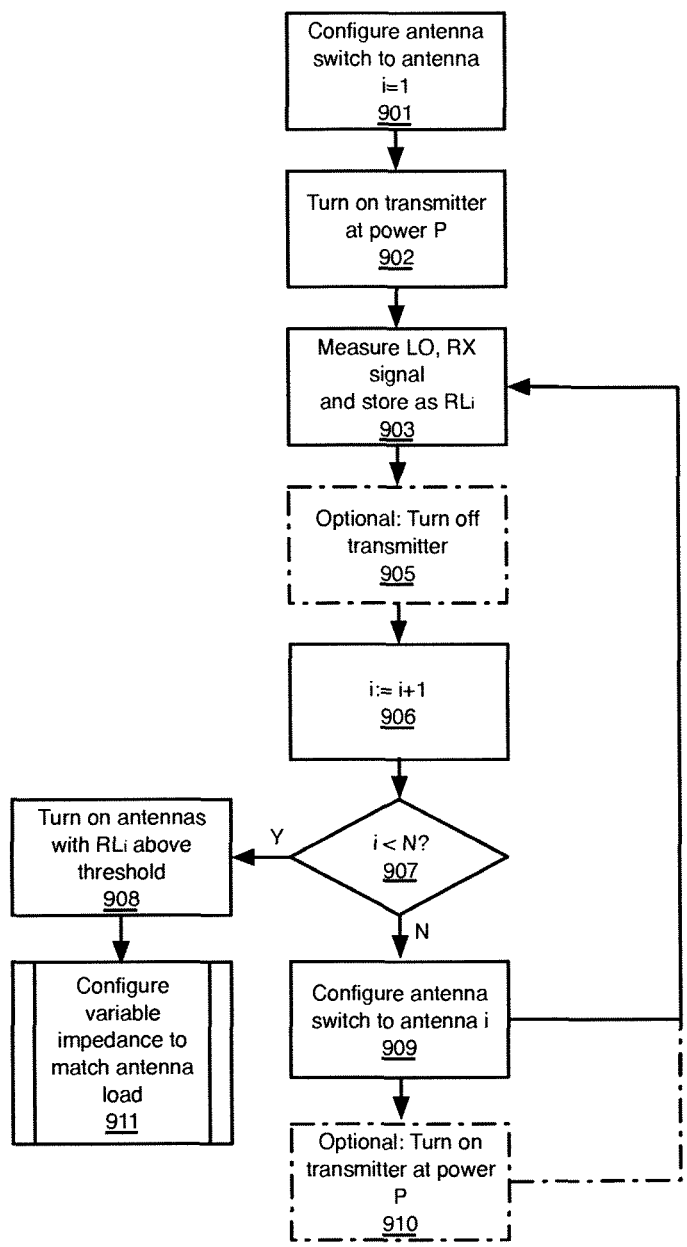
FIG. 9 is a logic flow diagram for determining the antenna (s) that should be selected in FIG. 8, in accordance with an exemplary embodiment.

FIG. 9 is a logic flow diagram for determining the antenna (s) that should be selected in FIG. 8, in accordance with an exemplary embodiment. At the start of the algorithm, the digital switch is configured 500 to switch position 1 901. If the analog switch can be damaged with the RF power on, the transmitter is optionally turned on to power P 902. This power may be lower than the final transmitter power, in order to save power. Measurements on the ISO and COUP ports are made on the directional coupler 505 at step 903. The ISO port measures the RX signal, while the COUP port measures the TX signal. The pair of TX (power or I&Q signal) and RX (power or I&Q signal) may be stored as a vector. The transmitter is then optionally turned off 905, and the counter i is incremented 906. If the value of i is less than N 907, the antenna is switched to this new setting 909, and optionally the power is turned on to power P 910, then the cycles is repeated again 903. If i is equal to N 907, the antenna switch 500 is configured to choose the antenna with the lowest combined LO and RX vector norm or highest return loss in dB 908. The variable impedance match 720 connected to the COUP port, such as that in FIG. 8 is changed to match the impedance to the connected antennas. In the case where the switch 500 allows multiple antennas to be connected together in parallel (corresponding loads may be present as well), the top M antennas (M<N) that have the lowest combined LO and RX vector norm or highest return loss in dB are selected. If the top M elements cannot be connected together, the switch elements may be switched in a time-sequenced manner.

In accordance with various alternative embodiments, multiple antenna elements and related circuitry and logic flows of the type discussed above can be used to characterize various aspects of the environment around the wireless communications device (referred to herein for convenience as proximity detection). Specifically, due to the fact that a portion of the transmitted RF signal may be reflected by an object back through the directional coupler (e.g., 505 in FIG. 5) into the receiver and a potential separate return path, the reflected energy can be characterized to detect such things as, for example, the presence or absence of an object (e.g., a person's hand or arm), the type of object (e.g., a metallic object vs. a body part), the distance of the object from the device, the location of the object relative to the device (e.g., whether the object at a front, back, or side of the device), movement of the object relative to the device (e.g., toward or away from the device and/or other movements), orientation of the object, etc. Thus, for example, processing circuitry in the device may transmit an RF reference signal, determine at least one characteristic of the RF reference signal reflected back from each of the plurality of antennas, and process the determined characteristics in order to control at least one function of the device (which may include control of an application running in the device). The RF reference signal may be constant (e.g., a single frequency) or may be variable (e.g., a sequence of different frequencies). The characteristic(s) can include such things as amplitude, vector, phase, dispersion, and/or shape or distortion of waveform of transmitted signal.

As but one example of a potential use for such proximity detection, a user interface for a device may utilize proximity information generated from such proximity detection to allow a user to control features of a device or application. As shown in FIGS. 4 and 5, the elements covered, for example 533, will show diminished return loss compared to the elements which are not covered, for example 530-532. This information may be used, for example, to detect the approach of a person to begin a user interface interaction even before the user makes physical contact with the device, thereby creating the impression of a magical experience for a user. The range at which return loss variations could be detected could be as small as contact with the mobile device, to several millimeters, to several tens of centimeters. The processing circuitry in the device may be implemented such that a significant increase in the backscatter signal without a tag response may indicate the presence of an object such as a hand or local body part. That is, the shielded antenna elements may be used for object detection. The shielded antenna elements may also be used to image the orientation of the object. The unshielded antenna elements may be used, for example, to interface with RFID tags or other backscatter devices. For example, currently, phones often will receive email updates by push methods, where a network socket is open and data from email providers is sent as soon as new email arrives into the account. Some email accounts receive email by checking email servers on some preset interval. These methods can appreciably drain a battery of a mobile device throughout the day. By being able to detect the human body approaching a device, it may provide sufficient time to wake up a device, connect to an email service, and start downloading email to the device, so that as soon as the user had logged into their device, the email appears ready. In other uses, proximity detection could be used quantitatively for interactivity (e.g., such as gaming or music creation), could be used to determine the disposition of the device (e.g., such as whether the device is being held, is placed in a holster, or is placed on a table, e.g., by virtue of different reflective characteristics of the different materials), could be used to control aspects of the device (e.g., if a cellphone is ringing, the volume may be reduced as the user's hand approaches the device), could be used for security purposes (e.g., to verify that two communicating devices are near one another, or to verify that a person is present for a transaction), or could be used for other proximity-based functions.

In particular embodiments, a wireless communications device may include a touch sensor for sensing contact by a human body or a human body part (e.g., a hand). For example, the wireless communications device may include a capacitive touchscreen or other type of embedded touch-sensing component. In such embodiments, the wireless communications device may be able to perform different functions depending upon whether the human body is approaching the wireless communications device or has come into contact with the wireless communications device. For example, in the above scenario where the volume of a ringing cellphone is reduced as the user's hand approaches the device, upon detecting that a human body is approaching, the wireless communications device may mute the ringing altogether once it has detected actual contact with the human body. In another example, the wireless communications device may activate a Wi-Fi connection and commence downloading email as the user's hand approaches the device, but only illuminate a display screen of the wireless communications device once it has detected actual contact with the human body. Such separation of functionality may enable the wireless communications device to conserve and focus its resources (e.g., battery life and processor cycles) so as to maximize performance or completion of the different functions. In particular embodiments, a wireless communications device may include other sensors, such as a motion sensor (e.g., a gyroscope or an accelerometer), that can be used in conjunction with a touch sensor to sense that the user is moving the wireless communications device (e.g., to pick it up off a surface and bring it closer to the user's eyes) while grasping it. In such embodiments, the wireless communications device may be able to perform additional functions. For example, upon detecting that the user is grasping the wireless communications device, moving it upwards, and orienting it so as to tilt a display screen of the wireless communications device upwards, the wireless communications device may activate location-based functionality (e.g., activating GPS to enable real-time location tracking and map routing).

In particular embodiments, proximity detection could be used in conjunction with a social-networking system, particularly in conjunction with information related to a social graph associated with the user. For example, proximity detection could be used to start downloading or updating social-networking information and content, such as, by way of example and not limitation, newsfeed items, images, videos, links, music, communications, articles, or blogs associated with nodes in the user's social graph or connections therebetween. The proximity of other devices to the user's device that are known to be associated with other users in the user's social graph may affect the way that social-networking content is downloaded (e.g., prioritizing download of social-networking content items related to those users), or may present an opportunity to synchronize the devices in proximity (e.g., wherein each device may represent a different note or key on a virtual xylophone; or wherein each device may be associated with a user who is assigned a role in a multi-player online game, and the device only enters "game mode" when within proximity of other game players, at which point it begins to deliver game-related notifications). In another example, proximity detection could be used to locate selected people in the user's social graph (e.g., those within a specified degree of separation)—for example, if the first user is milling around at an annual festival on the streets of a city, that user may wish to locate and meet up with friends who are also at the same festival. If the crowd is very dense, GPS may not provide a sufficient level of granularity, whereas by using proximity detection, the user's device might be able to indicate by visual or auditory indicator that the user's device is getting closer and closer to a friend's device.

Proximity detection might also be used to control functionality and features of the device in conjunction with the user's location (e.g., when a user is detected as being at a location that is not a designated "safe" area, a hand approaching the device triggers download of social-networking content but display of the content is blocked until the user is authenticated). The user's immediate location may be determined based on any information, such as, by way of example and not limitation, GPS, cell tower triangulation, a check-in to a location associated with the user, an attempt by the user's device to connect to a particular wireless network at a known location, detection of the user's device at a known location via RFID or NFC, a transaction at a known location that was completed using the user's device (e.g., paying for a meal at a restaurant or buying movie tickets at a theater).

In making a user interface that will separate manipulatory and ambulatory space for a mobile device interfacing with one or more RFID tags or other wireless communications devices, a time-of-flight-based measurement may be used to obtain an accurate separation of manipulatory and ambulatory space. For example, processing circuitry in the device can measure the time between transmitting an RF reference signal and receiving reflected energy at one or more of the antenna elements. Based on such time-based information, the device can determine, for example, the distance and/or location of an object relative to the device (e.g., if the reflection is received sooner at a first antenna element compared to a second antenna element—sometimes referred to as time-difference of arrival—then the object is likely to be closer to the first antenna element.

Figure 10:
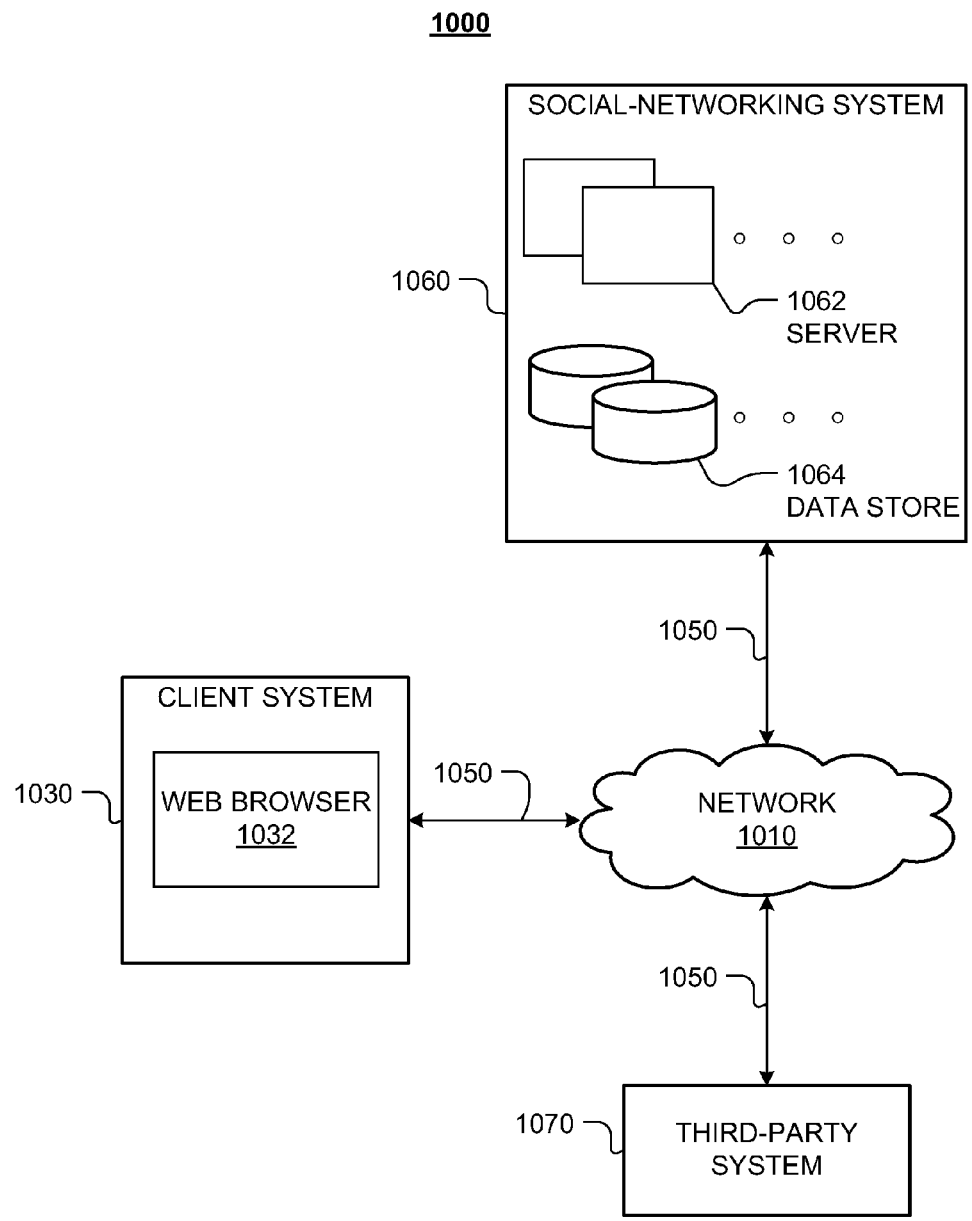
FIG. 10 illustrates an example network environment associated with a social-networking system.

FIG. 10 illustrates an example network environment 1000 associated with a social-networking system. Network environment 1000 includes a client system 1030, a social-networking system 1060, and a third-party system 1070 connected to each other by a network 1010. Although FIG. 10 illustrates a particular arrangement of client system 1030, social-networking system 1060, third-party system 1070, and network 1010, this disclosure contemplates any suitable arrangement of client system 1030, social-networking system 1060, third-party system 1070, and network 1010. As an example and not by way of limitation, two or more of client system 1030, social-networking system 1060, and third-party system 1070 may be connected to each other directly, bypassing network 1010. As another example, two or more of client system 1030, social-networking system 1060, and third-party system 1070 may be physically or logically co-located with each other in whole or in part. Moreover, although FIG. 10 illustrates a particular number of client systems 1030, social-networking systems 1060, third-party systems 1070, and networks 1010, this disclosure contemplates any suitable number of client systems 1030, social-networking systems 1060, third-party systems 1070, and networks 1010. As an example and not by way of limitation, network environment 1000 may include multiple client system 1030, social-networking systems 1060, third-party systems 1070, and networks 1010.

This disclosure contemplates any suitable network 1010. As an example and not by way of limitation, one or more portions of network 1010 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1010 may include one or more networks 1010.

Links 1050 may connect client system 1030, social-networking system 1060, and third-party system 1070 to communication network 1010 or to each other. This disclosure contemplates any suitable links 1050. In particular embodiments, one or more links 1050 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1050 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1050, or a combination of two or more such links 1050. Links 1050 need not necessarily be the same throughout network environment 1000. One or more first links 1050 may differ in one or more respects from one or more second links 1050.

In particular embodiments, client system 1030 may be an electronic device including hardware, software, or embedded logic components or a combination of two or more such components and capable of carrying out the appropriate functionalities implemented or supported by client system 1030. As an example and not by way of limitation, a client system 1030 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 1030. A client system 1030 may enable a network user at client system 1030 to access network 1010. A client system 1030 may enable its user to communicate with other users at other client systems 1030.

In particular embodiments, client system 1030 may include a web browser 1032, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1030 may enter a Uniform Resource Locator (URL) or other address directing the web browser 1032 to a particular server (such as server 1062, or a server associated with a third-party system 1070), and the web browser 1032 may generate a Hyper Text Transfer Protocol (HTTP) request and communicate the HTTP request to server. The server may accept the HTTP request and communicate to client system 1030 one or more Hyper Text Markup Language (HTML) files responsive to the HTTP request. Client system 1030 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 1060 may be a network-addressable computing system that can host an online social network. Social-networking system 1060 may generate, store, receive, and send social-networking data, such as, for example, user-profile data, concept-profile data, social-graph information, or other suitable data related to the online social network. Social-networking system 1060 may be accessed by the other components of network environment 1000 either directly or via network 1010. In particular embodiments, social-networking system 1060 may include one or more servers 1062. Each server 1062 may be a unitary server or a distributed server spanning multiple computers or multiple datacenters. Servers 1062 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1062 may include hardware, software, or embedded logic components or a combination of two or more such components for carrying out the appropriate functionalities implemented or supported by server 1062. In particular embodiments, social-networking system 1064 may include one or more data stores 1064. Data stores 1064 may be used to store various types of information. In particular embodiments, the information stored in data stores 1064 may be organized according to specific data structures. In particular embodiments, each data store 1064 may be a relational, columnar, correlation, or other suitable database. Although this disclosure describes or illustrates particular types of databases, this disclosure contemplates any suitable types of databases. Particular embodiments may provide interfaces that enable a client system 1030, a social-networking system 1060, or a third-party system 1070 to manage, retrieve, modify, add, or delete, the information stored in data store 1064.

In particular embodiments, social-networking system 1060 may store one or more social graphs in one or more data stores 1064. In particular embodiments, a social graph may include multiple nodes—which may include multiple user nodes (each corresponding to a particular user) or multiple concept nodes (each corresponding to a particular concept)—and multiple edges connecting the nodes. Social-networking system 1060 may provide users of the online social network the ability to communicate and interact with other users. In particular embodiments, users may join the online social network via social-networking system 1060 and then add connections (e.g., relationships) to a number of other users of social-networking system 1060 whom they want to be connected to. Herein, the term "friend" may refer to any other user of social-networking system 1060 with whom a user has formed a connection, association, or relationship via social-networking system 1060.

In particular embodiments, social-networking system 1060 may provide users with the ability to take actions on various types of items or objects, supported by social-networking system 1060. As an example and not by way of limitation, the items and objects may include groups or social networks to which users of social-networking system 1060 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1060 or by an external system of third-party system 1070, which is separate from social-networking system 1060 and coupled to social-networking system 1060 via a network 1010.

In particular embodiments, social-networking system 1060 may be capable of linking a variety of entities. As an example and not by way of limitation, social-networking system 1060 may enable users to interact with each other as well as receive content from third-party systems 1070 or other entities, or to allow users to interact with these entities through an application programming interfaces (API) or other communication channels.

In particular embodiments, a third-party system 1070 may include one or more types of servers, one or more data stores, one or more interfaces, including but not limited to APIs, one or more web services, one or more content sources, one or more networks, or any other suitable components, e.g., that servers may communicate with. A third-party system 1070 may be operated by a different entity from an entity operating social-networking system 1060. In particular embodiments, however, social-networking system 1060 and third-party systems 1070 may operate in conjunction with each other to provide social-networking services to users of social-networking system 1060 or third-party systems 1070. In this sense, social-networking system 1060 may provide a platform, or backbone, which other systems, such as third-party systems 1070, may use to provide social-networking services and functionality to users across the Internet.

In particular embodiments, a third-party system 1070 may include a third-party content object provider. A third-party content object provider may include one or more sources of content objects, which may be communicated to a client system 1030. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1060 also includes user-generated content objects, which may enhance a user's interactions with social-networking system 1060. User-generated content may include anything a user can add, upload, send, or "post" to social-networking system 1060. As an example and not by way of limitation, a user communicates posts to social-networking system 1060 from a client system 1030. Posts may include data such as status updates or other textual data, location information, photos, videos, links, music or other similar data or media. Content may also be added to social-networking system 1060 by a third-party through a "communication channel," such as a newsfeed or stream.

In particular embodiments, social-networking system 1060 may include a variety of servers, sub-systems, programs, modules, logs, and data stores. In particular embodiments, social-networking system 1060 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1060 may also include suitable components such as network interfaces, security mechanisms, load balancers, failover servers, management-and-network-operations consoles, other suitable components, or any suitable combination thereof. In particular embodiments, social-networking system 1060 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1060 to one or more client systems 1030 or one or more third-party system 1070 via network 1010. The web server may include a mail server or other messaging functionality for receiving and routing messages between social-networking system 1060 and one or more client systems 1030. An API-request server may allow a third-party system 1070 to access information from social-networking system 1060 by calling one or more APIs. An action logger may be used to receive communications from a web server about a user's actions on or off social-networking system 1060. In conjunction with the action log, a third-party-content-object log may be maintained of user exposures to third-party-content objects. A notification controller may provide information regarding content objects to a client system 1030. Information may be pushed to a client system 1030 as notifications, or information may be pulled from client system 1030 responsive to a request received from client system 1030. Authorization servers may be used to enforce one or more privacy settings of the users of social-networking system 1060. A privacy setting of a user determines how particular information associated with a user can be shared. The authorization server may allow users to opt in to or opt out of having their actions logged by social-networking system 1060 or shared with other systems (e.g., third-party system 1070), such as, for example, by setting appropriate privacy settings. Third-party-content-object stores may be used to store content objects received from third parties, such as a third-party system 1070. Location stores may be used for storing location information received from client systems 1030 associated with users. Advertisement-pricing modules may combine social information, the current time, location information, or other suitable information to provide relevant advertisements, in the form of notifications, to a user.

Figure 11:
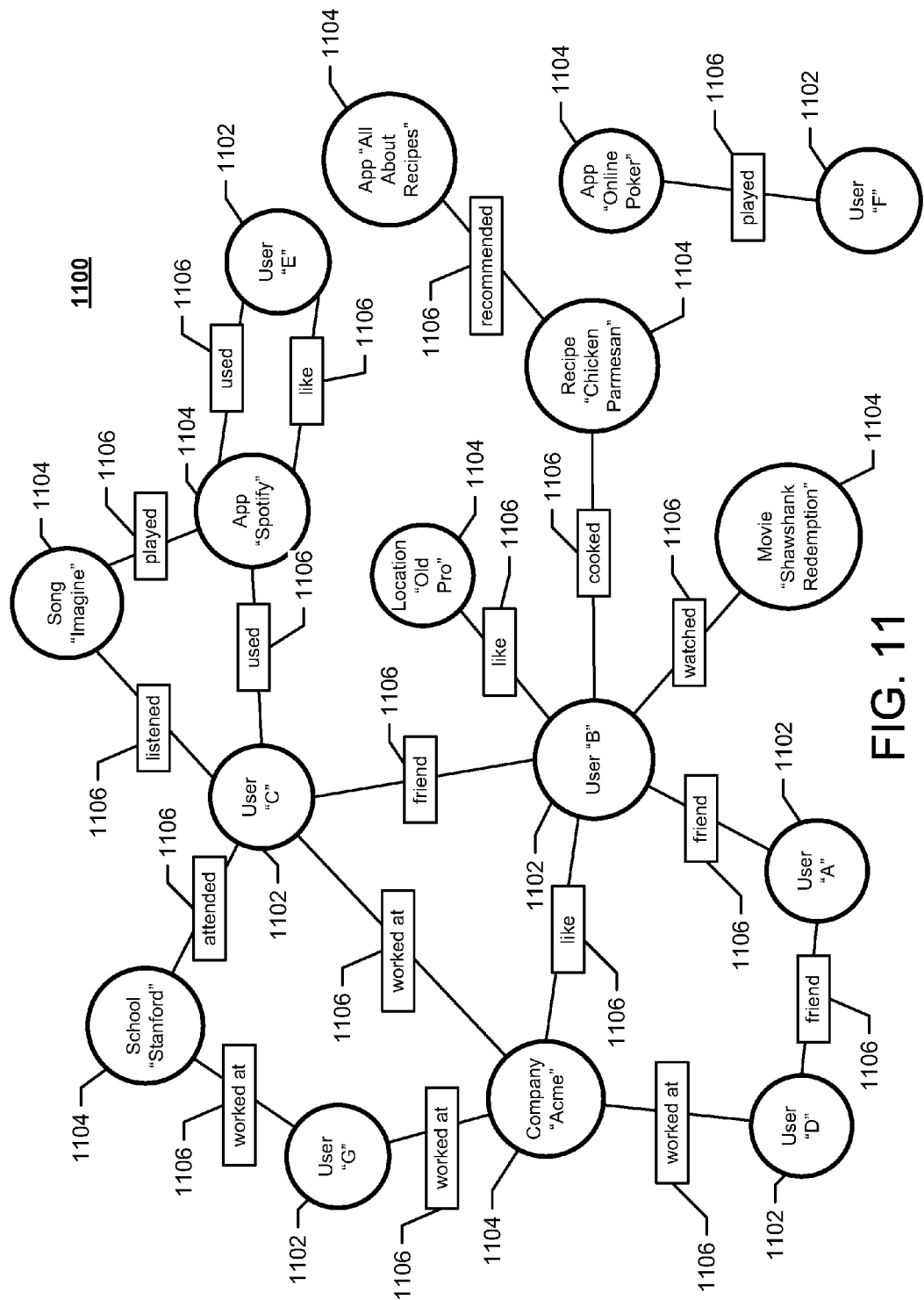
FIG. 11 illustrates an example social graph.

FIG. 11 illustrates example social graph 1100. In particular embodiments, social-networking system 1060 may store one or more social graphs 1100 in one or more data stores. In particular embodiments, social graph 1100 may include multiple nodes—which may include multiple user nodes 1102 or multiple concept nodes 1104—and multiple edges 1106 connecting the nodes. Example social graph 1100 illustrated in FIG. 11 is shown, for didactic purposes, in a two-dimensional visual map representation. In particular embodiments, a social-networking system 1060, client system 1030, or third-party system 1070 may access social graph 1100 and related social-graph information for suitable applications. The nodes and edges of social graph 1100 may be stored as data objects, for example, in a data store (such as a social-graph database). Such a data store may include one or more searchable or queryable indexes of nodes or edges of social graph 1100.

In particular embodiments, a user node 1102 may correspond to a user of social-networking system 1060. As an example and not by way of limitation, a user may be an individual (human user), an entity (e.g., an enterprise, business, or third-party application), or a group (e.g., of individuals or entities) that interacts or communicates with or over social-networking system 1060. In particular embodiments, when a user registers for an account with social-networking system 1060, social-networking system 1060 may create a user node 1102 corresponding to the user, and store the user node 1102 in one or more data stores. Users and user nodes 1102 described herein may, where appropriate, refer to registered users and user nodes 1102 associated with registered users. In addition or as an alternative, users and user nodes 1102 described herein may, where appropriate, refer to users that have not registered with social-networking system 1060. In particular embodiments, a user node 1102 may be associated with information provided by a user or information gathered by various systems, including social-networking system 1060. As an example and not by way of limitation, a user may provide his or her name, profile picture, contact information, birth date, sex, marital status, family status, employment, education background, preferences, interests, or other demographic information. In particular embodiments, a user node 1102 may be associated with one or more data objects corresponding to information associated with a user. In particular embodiments, a user node 1102 may correspond to one or more webpages.

In particular embodiments, a concept node 1104 may correspond to a concept. As an example and not by way of limitation, a concept may correspond to a place (such as, for example, a movie theater, restaurant, landmark, or city); a website (such as, for example, a website associated with social-network system 1060 or a third-party website associated with a web-application server); an entity (such as, for example, a person, business, group, sports team, or celebrity); a resource (such as, for example, an audio file, video file, digital photo, text file, structured document, or application) which may be located within social-networking system 1060 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1104 may be associated with information of a concept provided by a user or information gathered by various systems, including social-networking system 1060. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1104 may be associated with one or more data objects corresponding to information associated with concept node 1104. In particular embodiments, a concept node 1104 may correspond to one or more webpages.

In particular embodiments, a node in social graph 1100 may represent or be represented by a webpage (which may be referred to as a "profile page"). Profile pages may be hosted by or accessible to social-networking system 1060. Profile pages may also be hosted on third-party websites associated with a third-party server 1070. As an example and not by way of limitation, a profile page corresponding to a particular external webpage may be the particular external webpage and the profile page may correspond to a particular concept node 1104. Profile pages may be viewable by all or a selected subset of other users. As an example and not by way of limitation, a user node 1102 may have a corresponding user-profile page in which the corresponding user may add content, make declarations, or otherwise express himself or herself. As another example and not by way of limitation, a concept node 1104 may have a corresponding concept-profile page in which one or more users may add content, make declarations, or express themselves, particularly in relation to the concept corresponding to concept node 1104.

In particular embodiments, a concept node 1104 may represent a third-party webpage or resource hosted by a third-party system 1070. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 1030 to send to social-networking system 1060 a message indicating the user's action. In response to the message, social-networking system 1060 may create an edge (e.g., an "eat" edge) between a user node 1102 corresponding to the user and a concept node 1104 corresponding to the third-party webpage or resource and store edge 1106 in one or more data stores.

In particular embodiments, a pair of nodes in social graph 1100 may be connected to each other by one or more edges 1106. An edge 1106 connecting a pair of nodes may represent a relationship between the pair of nodes. In particular embodiments, an edge 1106 may include or represent one or more data objects or attributes corresponding to the relationship between a pair of nodes. As an example and not by way of limitation, a first user may indicate that a second user is a "friend" of the first user. In response to this indication, social-networking system 1060 may send a "friend request" to the second user. If the second user confirms the "friend request," social-networking system 1060 may create an edge 1106 connecting the first user's user node 1102 to the second user's user node 1102 in social graph 1100 and store edge 1106 as social-graph information in one or more of data stores 1064. In the example of FIG. 11, social graph 1100 includes an edge 1106 indicating a friend relation between user nodes 1102 of user "A" and user "B" and an edge indicating a friend relation between user nodes 1102 of user "C" and user "B." Although this disclosure describes or illustrates particular edges 1106 with particular attributes connecting particular user nodes 1102, this disclosure contemplates any suitable edges 1106 with any suitable attributes connecting user nodes 1102. As an example and not by way of limitation, an edge 1106 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1100 by one or more edges 1106.

In particular embodiments, an edge 1106 between a user node 1102 and a concept node 1104 may represent a particular action or activity performed by a user associated with user node 1102 toward a concept associated with a concept node 1104. As an example and not by way of limitation, as illustrated in FIG. 11, a user may "like," "attended," "played," "listened," "cooked," "worked at," or "watched" a concept, each of which may correspond to a edge type or subtype. A concept-profile page corresponding to a concept node 1104 may include, for example, a selectable "check in" icon (such as, for example, a clickable "check in" icon) or a selectable "add to favorites" icon. Similarly, after a user clicks these icons, social-networking system 1060 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 1060 may create a "listened" edge 1106 and a "used" edge (as illustrated in FIG. 11) between user nodes 1102 corresponding to the user and concept nodes 1104 corresponding to the song and application to indicate that the user listened to the song and used the application. Moreover, social-networking system 1060 may create a "played" edge 1106 (as illustrated in FIG. 11) between concept nodes 1104 corresponding to the song and the application to indicate that the particular song was played by the particular application. In this case, "played" edge 1106 corresponds to an action performed by an external application (SPOTIFY) on an external audio file (the song "Imagine"). Although this disclosure describes particular edges 1106 with particular attributes connecting user nodes 1102 and concept nodes 1104, this disclosure contemplates any suitable edges 1106 with any suitable attributes connecting user nodes 1102 and concept nodes 1104. Moreover, although this disclosure describes edges between a user node 1102 and a concept node 1104 representing a single relationship, this disclosure contemplates edges between a user node 1102 and a concept node 1104 representing one or more relationships. As an example and not by way of limitation, an edge 1106 may represent both that a user likes and has used at a particular concept. Alternatively, another edge 1106 may represent each type of relationship (or multiples of a single relationship) between a user node 1102 and a concept node 1104 (as illustrated in FIG. 11 between user node 1102 for user "E" and concept node 1104 for "SPOTIFY").

In particular embodiments, social-networking system 1060 may create an edge 1106 between a user node 1102 and a concept node 1104 in social graph 1100. As an example and not by way of limitation, a user viewing a concept-profile page (such as, for example, by using a web browser or a special-purpose application hosted by the user's client system 1030) may indicate that he or she likes the concept represented by the concept node 1104 by clicking or selecting a "Like" icon, which may cause the user's client system 1030 to send to social-networking system 1060 a message indicating the user's liking of the concept associated with the concept-profile page. In response to the message, social-networking system 1060 may create an edge 1106 between user node 1102 associated with the user and concept node 1104, as illustrated by "like" edge 1106 between the user and concept node 1104. In particular embodiments, social-networking system 1060 may store an edge 1106 in one or more data stores. In particular embodiments, an edge 1106 may be automatically formed by social-networking system 1060 in response to a particular user action. As an example and not by way of limitation, if a first user uploads a picture, watches a movie, or listens to a song, an edge 1106 may be formed between user node 1102 corresponding to the first user and concept nodes 1104 corresponding to those concepts. Although this disclosure describes forming particular edges 1106 in particular manners, this disclosure contemplates forming any suitable edges 1106 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 1060). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 1060. In addition or as an alternative, the social action may be promoted outside or off of social-networking system 1060, where appropriate. In particular embodiments, a page may be an on-line presence (such as a webpage or website within or outside of social-networking system 1060) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 1060. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. us 2012/0203831, entitled "Sponsored Stories Unit Creation from Organic Activity Stream" and filed 3 Feb. 2012 as U.S. patent application Ser. No. 13/020,745, or U.S. Patent Application Publication No. us 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 1060) or RSVP (e.g., through social-networking system 1060) to an event associated with the advertisement. In addition or as an alternative, an advertisement may include social-networking-system context directed to the user. For example, an advertisement may display information about a friend of the user within social-networking system 1060 who has taken an action associated with the subject matter of the advertisement.

Social-networking-system functionality or context may be associated with an advertisement in any suitable manner. For example, an advertising system (which may include hardware, software, or both for receiving bids for advertisements and selecting advertisements in response) may retrieve social-networking functionality or context from social-networking system 1060 and incorporate the retrieved social-networking functionality or context into the advertisement before serving the advertisement to a user. Examples of selecting and providing social-networking-system functionality or context with an advertisement are disclosed in U.S. Patent Application Publication No. US 2012/0084160, entitled "Providing Social Endorsements with Online Advertising" and filed 5 Oct. 2010 as U.S. patent application Ser. No. 12/898,662, and in U.S. Patent Application Publication No. US 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or context may cause information about the interaction to be displayed in a profile page of the user in social-networking-system 1060.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 1060 to identify those users. In addition or as an alternative, social-networking system 1060 may use user-profile information in social-networking system 1060 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 1060, off or outside of social-networking system 1060, or on mobile computing devices of users. When on or within social-networking system 1060, such targeting may be directed to users' news feeds, search results, e-mail or other in-boxes, or notifications channels or may appear in particular area of web pages of social-networking system 1060, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 1060, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 1060 or explicit connections of a user to a node, object, entity, brand, or page on social-networking system 1060. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. US 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. US 2009/0070219, entitled "Targeting Advertisements in a Social Network" and filed 20 Aug. 2008 as U.S. patent application Ser. No. 12/195,321; U.S. Patent Application Publication No. US 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. US 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. US 2012/0159635, entitled "Comment Plug-In for Third-Party System" and filed 15 Dec. 2010 as U.S. patent application Ser. No. 12/969,368; U.S. Patent Application Publication No. US 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Patent Application Publication No. US 2008/0040475, entitled "Providing a News Feed Based on User Affinity in a Social Network Environment" and filed 11 Aug. 2006 as U.S. patent application Ser. No. 11/503,093; U.S. Patent Application Publication No. US 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. US 2008/0065701, entitled "Method and System for Tracking Changes to User Content in an Online Social Network" and filed 12 Sep. 2006 as U.S. patent application Ser. No. 11/531,154; U.S. Patent Application Publication No. US 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. US 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. US 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, social-networking system 1060 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1070 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 1060 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 1060 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 1060 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 1060 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 1060 may calculate a coefficient based on a user's actions. Social-networking system 1060 may monitor such actions on the online social network, on a third-party system 1070, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 1060 may calculate a coefficient based on the user's actions with particular types of content. The content may be associated with the online social network, a third-party system 1070, or another suitable system. The content may include users, profile pages, posts, news stories, headlines, instant messages, chat room conversations, emails, advertisements, pictures, video, music, other suitable objects, or any combination thereof. Social-networking system 1060 may analyze a user's actions to determine whether one or more of the actions indicate an affinity for subject matter, content, other users, and so forth. As an example and not by way of limitation, if a user may make frequently posts content related to "coffee" or variants thereof, social-networking system 1060 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 1060 may calculate a coefficient based on the type of relationship between particular objects. Referencing the social graph 1100, social-networking system 1060 may analyze the number and/or type of edges 1106 connecting particular user nodes 1102 and concept nodes 1104 when calculating a coefficient. As an example and not by way of limitation, user nodes 1102 that are connected by a spouse-type edge (representing that the two users are married) may be assigned a higher coefficient than a user nodes 1102 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 1060 may determine that the user has a higher coefficient with respect to the first photo than the second photo because having a tagged-in-type relationship with content may be assigned a higher weight and/or rating than having a like-type relationship with content. In particular embodiments, social-networking system 1060 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 1060 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1100. As an example and not by way of limitation, social-graph entities that are closer in the social graph 1100 (i.e., fewer degrees of separation) may have a higher coefficient than entities that are further apart in the social graph 1100.

In particular embodiments, social-networking system 1060 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 1030 of the user). A first user may be more interested in other users or concepts that are closer to the first user. As an example and not by way of limitation, if a user is one mile from an airport and two miles from a gas station, social-networking system 1060 may determine that the user has a higher coefficient for the airport than the gas station based on the proximity of the airport to the user.

In particular embodiments, social-networking system 1060 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 1060 may provide information that is relevant to user's interests and current circumstances, increasing the likelihood that they will find such information of interest. In particular embodiments, social-networking system 1060 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 1060 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 1060 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1070 (e.g., via an API or other communication channel), or from another suitable system. In response to the request, social-networking system 1060 may calculate the coefficient (or access the coefficient information if it has previously been calculated and stored). In particular embodiments, social-networking system 1060 may measure an affinity with respect to a particular process. Different processes (both internal and external to the online social network) may request a coefficient for a particular object or set of objects. Social-networking system 1060 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser.

No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions. Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

It should be noted that headings are used above for convenience and are not to be construed as limiting the present invention in any way.

It should be noted that terms such as "client," "server," "switch," and "node" may be used herein to describe devices that may be used in certain embodiments and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the disclosed embodiments, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Particular embodiments of a wireless communications device having a plurality of antennas may provide a method of controlling the wireless communications device by (1) transmitting an RF signal, (2) receiving a portion of the transmitted RF signal reflected by the object by each of the antennas, (3) determining the proximity of the object to the wireless communications device based on a signal strength of the received signal, and (4) controlling the wireless communications device based on the proximity of the object.

Particular embodiments of a wireless communications device having a plurality of antennas may detect orientation of an object by (1) receiving signals from each of the plurality of antennas, (2) determining a signal level of each of the signals, and (3) determining the orientation of the object based on the relative signal levels of the signals. Determining the orientation of the object based on the relative signal levels of each of the signals may comprise: (1) shielding at least one of the antennas based on the relative signal levels, and (2) determining the orientation based on at least one of a pattern of shielded antennas or a pattern of un-shielded antennas. The wireless communications device may be a mobile phone that includes an RFID reader. The wireless communications device may also include one or more auxiliary antennae coupled to the RFID reader.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments may be implemented as a combination of both software (e.g., a computer program product) and hardware. Still other embodiments are implemented as entirely hardware, or entirely software.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A wireless communications device comprising:
an RF transceiver;
a touch sensor;
a plurality of antennas coupled to the transceiver; and
processing circuitry coupled to the RF transceiver and the touch sensor, the processing circuitry configured to:
cause the RF transceiver to transmit an RF reference signal;
determine at least one characteristic of the RF reference signal reflected back from each of the plurality of antennas; and
control at least one function of the device, by:
based on the at least one determined characteristic, characterizing at least one aspect of an environment around the device to determine that an object is approaching the device;
based on determining that the object is approaching the device, activating a first feature of the device, wherein the first feature is activated prior to the object being in contact with the device; and
activating a second feature of the device based on a signal received from the touch sensor indicating that the object is in contact with the device.

2. The device of claim 1, wherein the at least one characteristic includes at least one of:
amplitude;
phase;
dispersion;
waveform shape; or
distortion.

3. The device of claim 1, wherein the at least one aspect includes at least one of:
the presence or absence of the object;
the distance of the object from the device;
the location of the object relative to the device;
movement of the object relative to the device;
orientation of the object relative to the device;

a disposition of the device; or a time-of-flight measurement of the object to the device.

4. The device of claim 1, wherein the object includes a body part.

5. The device of claim 1, further comprising a motion sensor, wherein a third feature of the device is activated upon detecting that the device is in motion while the object is in contact with the device.

6. The device of claim 1, wherein the first feature comprises downloading information or content to the device, the information or content comprising email, newsfeed items, images, videos, links, music, communications, articles, or blogs.

7. The device of claim 1, wherein the first feature comprises reducing a volume of a sound generated by the device.

8. The device of claim 1, wherein the second feature comprises illuminating a display screen of the device.

9. The device of claim 1, wherein the second feature comprises muting a sound generated by the device.

10. A method comprising:
    transmitting, by an RF transceiver of a wireless communications device, an RF reference signal;
    determining, by a processor of the device, at least one characteristic of the RF reference signal reflected back from each of a plurality of antennas coupled to the transceiver; and
    controlling, by the processor, at least one function of the device, by:
        based on the at least one determined characteristic, characterizing at least one aspect of an environment around the device to determine that an object is approaching the device;
        based on determining that the object is approaching the device, activating a first feature of the device, wherein the first feature is activated prior to the object being in contact with the device; and
        activating a second feature of the device based on a signal received from a touch sensor of the device, the signal indicating that the object is in contact with the device.

11. The method of claim 10, wherein the at least one aspect includes at least one of:
    the presence or absence of the object;
    the distance of the object from the device;
    the location of the object relative to the device;
    movement of the object relative to the device;
    orientation of the object relative to the device;
    a disposition of the device; or
    a time-of-flight measurement of the object to the device.

12. The method of claim 10, wherein the object includes a body part.

13. The method of claim 10, further comprising:
    detecting, by a motion sensor of the device, that the device is in motion while the object is in contact with the device; and
    activating a third feature of the device.

14. The method of claim 10, wherein the at least one characteristic includes at least one of:
    amplitude;
    phase;
    dispersion;
    waveform shape; or
    distortion.

15. The method of claim 10, wherein the first feature comprises downloading information or content to the device, the information or content comprising email, newsfeed items, images, videos, links, music, communications, articles, or blogs.

16. The method of claim 10, wherein the first feature comprises reducing a volume of a sound generated by the device.

17. The method of claim 10, wherein the second feature comprises illuminating a display screen of the device.

18. The method of claim 10, wherein the second feature comprises muting a sound generated by the device.

19. One or more computer-readable non-transitory storage media embodying software that is operable when executed to:
    transmit, by an RF transceiver of a wireless communications device, an RF reference signal;
    determine, by a processor of the device, at least one characteristic of the RF reference signal reflected back from each of a plurality of antennas coupled to the transceiver; and
    control, by the processor, at least one function of the device, by:
        based on the at least one determined characteristic, characterizing at least one aspect of an environment around the device to determine that an object is approaching the device;
        based on determining that the object is approaching the device, activating a first feature of the device, wherein the first feature is activated prior to the object being in contact with the device; and
        activating a second feature of the device based on a signal received from a touch sensor of the device, the signal indicating that the object is in contact with the device.

20. The media of claim 19, wherein the at least one characteristic includes at least one of:
    amplitude;
    phase;
    dispersion;
    waveform shape; or
    distortion.

21. The media of claim 19, wherein the at least one aspect includes at least one of:
    the presence or absence of the object;
    the distance of the object from the device;
    the location of the object relative to the device;
    movement of the object relative to the device;
    orientation of the object relative to the device;
    a disposition of the device; or
    a time-of-flight measurement of the object to the device.

22. The media of claim 19, wherein the object includes a body part.

23. The media of claim 19, wherein the software is further operable when executed to:
    detect, by a motion sensor of the device, that the device is in motion while the object is in contact with the device; and
    activate a third feature of the device.

24. The media of claim 19, wherein the first feature comprises downloading information or content to the device, the information or content comprising email, newsfeed items, images, videos, links, music, communications, articles, or blogs.

25. The media of claim 19, wherein the first feature comprises reducing a volume of a sound generated by the device.

26. The media of claim 19, wherein the second feature comprises illuminating a display screen of the device.

27. The media of claim 19, wherein the second feature comprises muting a sound generated by the device.

* * * * *